Patented Mar. 11, 1941

2,234,855

UNITED STATES PATENT OFFICE 2,234,855

ELECTRIC WELDING METHOD

Frank H. Rehse, Dayton, Ohio, assignor of one-fifth to Max Isaacson, Dayton, Ohio No Drawing. Original application August 13, 1936, Serial No. 95,776, now Patent No. 2,193,490, dated March 12, 1940. Divided and this application May 2, 1939, Serial No. 271,407

12 Claims. (Cl. 219—10)

This invention relates to a process of electric resistance welding and although it can be used to advantage in any of the forms of electric resistance welding and with various kinds of metals it has particular relation to the flash welding of abutting edges of parts of hollow articles or pipe sections and is especially useful in connection with the welding of seams which by reason of arrangement or length offers non-uniform heating of the adjoining edges, this application being a division of my copending application Serial No. 95,776, filed August 13, 1936 (now Patent No. 2,193,490, dated March 12, 1940), wherein I have shown and described my invention as applied to the flash butt welding of cast ferrous pipe sections.

When the adjoining edges of two hollow articles such as the abutting edges of two tube sections of large diameter and heavy gage are extensive in circumferential length and of considerable wall thickness, the heating effect of those portions that are furthest from the effective center of current distribution is substantially less than those portions that are nearest thereto. Likewise, when the wall thickness of either or both of the edges of such articles are not uniform, and also where the grain structure is not uniform as frequently occurs in cast ferrous metals, the heating effect of those portions of greater metal area or of those portions having smaller and dense grain structure will be less than that having less metal area or larger grain size and open structure. In my copending continuation in part application Serial No. 243,239, filed Nov. 30, 1938, in which the invention disclosed therein is applied to the welding of two radiator sections having extensively spaced adjoining portions, I have overcome the difficulty of irregular heating effects by varying the relative position of at least one of the electrode terminals with respect to the adjoining edges, i. e., by altering the effective center of current distribution to thereby vary the current path lengths in a manner to obtain uniform heating effects.

My present invention contemplates a novel method of butt welding in which the edges to be joined are uniformly heated during welding, by causing the work pieces to be moved relative to their respective centers of current distribution in such a manner as to obtain an average substantially uniform current path length through the different portions of the work pieces and by causing, if necessary and at any stage in the welding process, a rearrangement between the work pieces for varying the relative metal resistances of the different portions of the work pieces to current flow therethru so as to reduce to a minimum the difference in the resistances between maximum and minimum resistances circumferentially of the work pieces.

According to the present process, in the preferred mode of operation as applied to the welding of ferrous cast metal pipe sections, I bring the opposed ends of the work pieces into contact and establish a current flow through the work pieces by applying transversely thereto a suitable welding current, preferably of low voltage but of relatively large volume. As soon as the welding current is established the opposed ends are brought into arcing relation by either separating the work pieces to establish an electric arc or by rotating the same relative to each other for this purpose and thereafter they are moved relatively longitudinally towards each other and they are also rotated relative to each other. These two movements after the arc is established are preferably carried out simultaneously, the longitudinal movement being at a rate that will maintain the arc as the metal projections are being flashed away during relative rotation. Any unevenness in the welding faces or any out of alignment thereof from a transverse plane normal to the longitudinal path of the work pieces will be corrected by both a longitudinal and transverse flashing off of the projecting portions until the flashing arc is substantially uniform and lies substantially in the said transverse plane. It will thus be seen that the trimming of the welding faces into parallel relation is accomplished by progressively advancing the work pieces towards each other as the metal of the projecting portions which are brought into contact by both the longitudinal and angular relative movements of the work pieces, is flashed away. This step in the process may be carried out in any suitable welding machine, as for example, the apparatus shown and described in my above referred to copending application Serial No. 95,776, in which the two parts to be welded are firmly clamped by suitable clamping electrodes which constitute the terminals of the transformer secondary and in which provision is made for effecting both a rotational movement and a longitudinal movement of one part relative to the other, said relative movements to be accomplished, independently or simultaneously, and in any desired order or sense of direction and at any suitable relative speed of operation.

It will, of course, be obvious that this metal trimming operation may be accomplished by bringing the work pieces into different circumferential or transverse positions and effecting a longitudinal "flashing off" operation of the work pieces at each of these different positions. This procedure consists in moving the work pieces relatively towards each other, while the flashing arc is established, to flash away the metal projections of early contacting portions, thereafter rotating the same relative to one another to a different circumferential position and then again moving the same relatively towards each other to flash away contacting projections in this position. The relative circumferential position of the work pieces is varied as many times as is necessary to bring about, by such longitudinal flashing off operations, the desired result.

The particular positions for each such operation and the number of such operations will be determined by the operator as the trimming operation proceeds. The greater the number of relative circumferential positions of the work pieces selected for effecting the longitudinal flashing operation, the more accurate will be the parallel relation of the welding faces and their alignment with a plane normal to their common axis of rotation.

Should the heated metal edges during the "flashing off" step or steps indicate any irregularities in the heating thereof, circumferentially of either work piece primarily because of the unequal resistances of directly opposing metal portions which is made evident by a difference in the temperature of directly opposing portions of the edges, then such portions of the metal edges of the tubes which respectively indicate maximum temperature values will be positioned directly opposite to each other by rotating the work pieces relative to each other a sufficient amount for effecting such positioning. For this purpose the work pieces may be rearranged when the irregularities in the heating have manifested themselves and as often as is deemed necessary to reduce to an optimum minimum the circumferential variation in resistance. It is obvious that such rearrangement of the work pieces for approaching as nearly as possible, uniformity in the circumferential resistance may be effected when the heated edges of the work pieces are in arcing relation, while in contacting relation or while temporarily separated, it being preferred, however, that the rearrangement of the work pieces for obtaining optimum uniformity of metal resistance to current flow take place while the work pieces are under the influence of the welding current and after the faces are trimmed into parallelism by the flash trimming step. If during this "flashing off" step it appears that the opposite edge portions have substantially the same temperature but that the circumferential temperature of the work pieces is not uniform, then, if desired, the work pieces respectively may be rotated preferably rapidly with respect to the effective centers of current distribution and slowly relative to each other to thereby accomplish both substantial parallelism of welding faces and substantial uniform flashing and heating of the edges.

After the work pieces are suitably rearranged they are brought into light contacting relation preparatory for "preheating." This "preheating" step consists in maintaining the edges of the work pieces in abutting relation under light pressure while applying the welding current transversely to the work pieces at suitable points spaced from the edges. The purpose of the preheating is to obtain a distribution of the heat at the edges and as a result thereof the walls of the pipe sections adjacent the edges and between the electrodes by which the current is applied thereto become heated for a distance back of the edges. The preheating is continued until the metal is heated to a red heat or ignition temperature that is slightly less than the welding temperature.

Variation circumferentially in the wall thickness of either or both of the metal portions of the work pieces in the welding circuit will cause, during preheating, irregularities in the progressive heating from the contacting edges towards the point of current application. Likewise, variations in the current path lengths thru such portions will cause irregularity in the progressive heating thereof. Where both such variations exist and are comparable the one circumferentially varying resistance may be utilized during preheating, to counteract the other. This may be accomplished by differentially adjusting the work pieces thru relative rotation with respect to each other to reduce to a minimum the difference in effective areas of directly opposing portions and then arranging both work pieces relative to the point of current application in such a manner that the opposing portions of maximum wall thickness will be located in the region of minimum current paths lengths and the portions of minimum wall thickness will be located in the region of maximum current paths lengths so that the total resistances of the different current paths circumferentially of the work pieces are substantially uniform. These relative rotations may, if desired, be accomplished simultaneously by rotating both work pieces with respect to each other and with respect to their centers of current distribution, the work pieces rotating at different suitable speeds which may be varied during rotation until the desired temperature effect is obtained.

If the irregularity in the circumferential temperature results practically entirely from unequal current path lengths, then the desired distribution of the current flow thru each portion will be obtained by rotating the work pieces in unison at a suitable speed. In so doing an average current path length for each of the different elemental portions of the edge portions during each 360° of rotation will be obtained. If desired the speed of rotation of the work pieces will be made to correspond to the rate of change of temperature in the metal with respect to time as will be determined from the average temperature gradient for a given metal and voltage.

The next step involves a further flashing operation to bring the metal of the edges to welding temperature which, in the case of cast ferrous metal, is such as to produce a relatively thin film of molten metal on the metal edge faces. This condition is brought about by effecting a separation of the heated edges while maintaining the application of welding current thereto to thereby establish a flashing arc between the edges for their full column length.

The metal of the edges is flashed away progressively by the arc as the work pieces are moved toward each other at a rate to maintain the flashing arc for the required time. During this "flashing off" operation the work pieces are again caused to rotate relative to one another and at a suitable speed to maintain the contacting surface of the adjoining edges of the pipe sections in parallel relation and in a plane substantially normal to the path of motion of the work pieces. The separation of the work pieces for establishing the electric arc may be effected by flashing away metal as the work pieces are rotated relatively to each other or it may be accomplished by moving work pieces away from one another a distance sufficient to draw the arc. Thereafter the work pieces are again moved toward each other. The relative rotation of the work pieces continues until the molten or fused edges are brought together to produce the weld or shortly thereafter but while the metal edges are still molten to improve grain growth of the metal at the joint. The relative rotation of the work pieces during "flashing off" has the further advantage of driving out gas, slag and other foreign materials making possible the obtainment of an arc of uniform density which results in uniform heating of the metal edges and to that extent improves the weld when the edges are finally brought together.

After the metal edges have attained the welding temperature they are brought together and into contactual relation. This welding temperature for carrying out the process with ferrous cast metal is preferably such as to melt the metal edges to a molten state forming a thin film on the faces thereof, and the work pieces, when this condition is obtained, are quickly brought together and abruptly stopped so that the extent of movement of the work pieces towards each other after initial contact is not materially in excess of the distance corresponding to the thickness of the films. In this way the molten metal is caused to flow together with a minimum of extrusion of the metal from between the edges and with a minimum or negligible disruption of the crystalline structure of the metal at the weld. The extent of relative rotation of the work pieces during the time when the edges are first brought into contact up to the time when the longitudinal movement of the work pieces ceases is preferably limited to a small angle sufficient to bring about an improved grain growth by minimizing the effect of the existing impurities in the weld. At the same time that the edges are heated to a molten state or shortly thereafter the application of the welding current is stopped by opening the circuit.

I claim:

1. The method of flash butt-welding two tubular pieces of work which comprises the steps of bringing the faces of the edges to be butt-welded into contacting relation while passing an electric welding current therethru to bring said faces to a temperature that is slightly less than the welding temperature, rotating one piece of work relative to the other about a common axis while maintaining said arcing relation to thereby "flash off" said faces into parallelism and bringing said faces into engagement when said faces are at welding temperature.

2. In the method of flash butt-welding two pieces of work, the steps of moving one piece of work linearly towards and angularly with respect to another while passing an electric welding current therethrough and while in arcing relation to "flash off" the adjacent faces into parallelism and to heat the same to a welding temperature and bringing said faces into engagement when said faces are at welding temperature.

3. The method of butt-welding two tubular pieces of work which comprises the steps of bringing the edges to be butt-welded in contact, passing an electric welding current through the edges by applying current transversely to said work pieces from effective centers of current distribution, respectively, to preheat the same to a temperature that is slightly less than the welding temperature, rotating one of said work pieces relative to the other to such an extent during said preheating, as to suitably vary the relation of the metal resistances of the work pieces with respect to the lengths of the current paths therethru and thereby minimizing the variation in the values of the current paths resistances, rotating said pieces substantially in unison and relative to their effective centers of current distribution and bringing said pieces together while said faces are at welding temperature.

4. In butt-welding manufacture the process of trimming into parallelism the adjoining faces of two pieces of work to be butt-welded which consists in bringing said faces into such adjacent relation as to establish an arc by passing an electric welding current therethru and rotating one piece of work relative to the other while in arcing relation to thereby "flash off" said faces into parallelism.

5. In butt-welding manufacture the process of trimming into parallelism the adjoining faces of two cylindrical tubular pieces of work to be butt-welded which consists in moving said faces relatively towards one another and rotating the same relative to one another about a common axis while passing an electric welding current therethru and while in arcing relation to thereby "flash off" said faces into parallelism.

6. In butt-welding manufacture, the process of trimming into parallelism the adjoining faces of two pieces of work to be butt-welded which consists in simultaneously moving said pieces of work relatively towards and rotating the same relative to one another while passing an electric welding current therethru and while in arcing relation to thereby "flash off" said faces into parallelism.

7. The method of flash butt-welding two pieces of cast ferrous metal tubing which comprises the steps of bringing the faces to be butt-welded into contact relation, passing an electric current through said faces to preheat the same to a temperature that is slightly less than the welding temperature, separating the work pieces to bring said faces into arcing relation, rotating said work pieces relative to one another to an extent sufficient to suitably vary the relation of the metal resistances of the work pieces with respect to the lengths of the current paths therethru to minimize variation in the resistance values of the current paths to obtain a substantially uniform temperature of the material adjacent said contacting faces, separating said faces to establish an electric arc and immediately moving said faces relatively towards one another at a sufficient speed to maintain said arc and bringing said faces together when said faces have reached a molten temperature.

8. The method of flash butt-welding two pieces of cast ferrous metal tubing which comprises the steps of bringing the faces to be butt-welded into contact relation, passing an electric current through said faces by applying the current transversely of the work pieces from effective centers of current distribution respectively to preheat the same to a temperature that is slightly less than the welding temperature, while rotating said work pieces simultaneously with respect to their effective centers of current distribution to obtain a substantially uniform temperature circumferentially at the edges, separating said faces to establish an electric arc and immediately moving said faces relatively towards one another at a sufficient speed to maintain said arc and bringing said faces together, when said faces have reached a molten temperature.

9. The method of butt-welding two large diameter metal pipe sections comprising the steps of abutting the pipe sections in end to end relationship, passing welding current thru the abutting edges more or less uniformly substantially throughout their circumferential extent by applying current transversely of the pipe sections and at a suitable distance from the abutting edges while simultaneously rotating both pipe sections relative to their effective centers of current distribution to produce a substantial uniformity of temperature circumferentially at the edges and welding the seam by bringing the edges together with welding pressure while at welding temperature.

10. The method of flash butt-welding two cast ferrous metal pipe sections which comprises the steps of applying welding current transversely of the work pieces from effective centers of current distribution respectively, bringing the faces to be butt-welded into arcing relation, moving said sections linearly towards and angularly with respect to one another to maintain said arcing relation and to effect both parallelism and substantial circumferential uniformity of temperature of said faces, moving said faces into contact to preheat the edges to a temperature that is slightly less than the welding temperature, rotating both sections together relative to their effective centers of current distribution for obtaining and maintaining more or less uniform temperature substantially thruout the circumferential extent of said edges, bringing said faces again into arcing relation, moving said faces relatively towards one another at a sufficient speed to maintain said arcing relation and bringing said faces together when said faces have reached a molten temperature.

11. The method of flash butt-welding two cast ferrous metal pipe sections which comprises the steps of applying welding current transversely of the work pieces from effective centers of current distribution respectively, bringing the faces to be butt-welded into arcing relation moving said sections linearly towards and angularly with respect to one another to maintain said arcing relation and to effect both parallelism and substantial circumferential uniformity of temperature of said faces, moving said faces into contact to preheat the edges to a temperature that is slightly less than the welding temperature, rotating both sections together relative to their effective centers of current distribution for obtaining and maintaining more or less uniform temperature substantially thruout the circumferential extent of said edges, bringing said faces again into arcing relation, moving said faces relatively towards and angularly with respect to one another at suitable speeds respectively to maintain both said arcing relation and said parallelism and bringing said faces together when said faces have reached a molten temperature.

12. In the method of butt welding two tubular pieces of work in which the electric welding current is applied from effective centers of current distribution, the step of rotating said work pieces substantially in unison relative to their respective effective centers of current distribution to thereby subject each of the longitudinal sections of the portions of each of the work pieces to which the welding current is applied to an average current path length for obtaining a substantially uniform temperature throughout the circumference of the abutting edges.

FRANK H. REHSE.